United States Patent [19]

Garrett

[11] 4,108,457
[45] Aug. 22, 1978

[54] CAMPER STEPS

[76] Inventor: Dale Garrett, Rte. 1. Box 354, Rockaway, Oreg. 97136

[21] Appl. No.: 712,840

[22] Filed: Aug. 9, 1976

[51] Int. Cl.$^2$ .............................................. B60R 3/02
[52] U.S. Cl. ................................... 280/166; 105/447; 105/449; 182/95
[58] Field of Search ................... 280/166; 182/95, 97, 182/98; 105/447, 449

[56] References Cited

U.S. PATENT DOCUMENTS

| 1,026,167 | 5/1912 | Jefferson | 182/95 |
|---|---|---|---|
| 3,067,835 | 12/1962 | Valley | 182/95 |
| 3,507,515 | 4/1970 | Brammer | 280/166 |
| 3,606,382 | 9/1971 | Pollock | 280/166 |
| 3,807,757 | 4/1974 | Carpenter et al. | 280/166 |

FOREIGN PATENT DOCUMENTS 2,247,079  5/1975  France ..................................... 280/166

Primary Examiner—John J. Love
Assistant Examiner—Michael J. Forman
Attorney, Agent, or Firm—Kolisch, Hartwell, Dickinson & Stuart

[57] ABSTRACT

This invention consists primarily of a rectangular frame having adapters for securing it to the rear of a camper. The device includes a pair of steps, which fold flat when not in use, and are provided with link rods, for enabling them to fold and open, and the device further includes guide channels and stops for the lower step portion.

2 Claims, 4 Drawing Figures

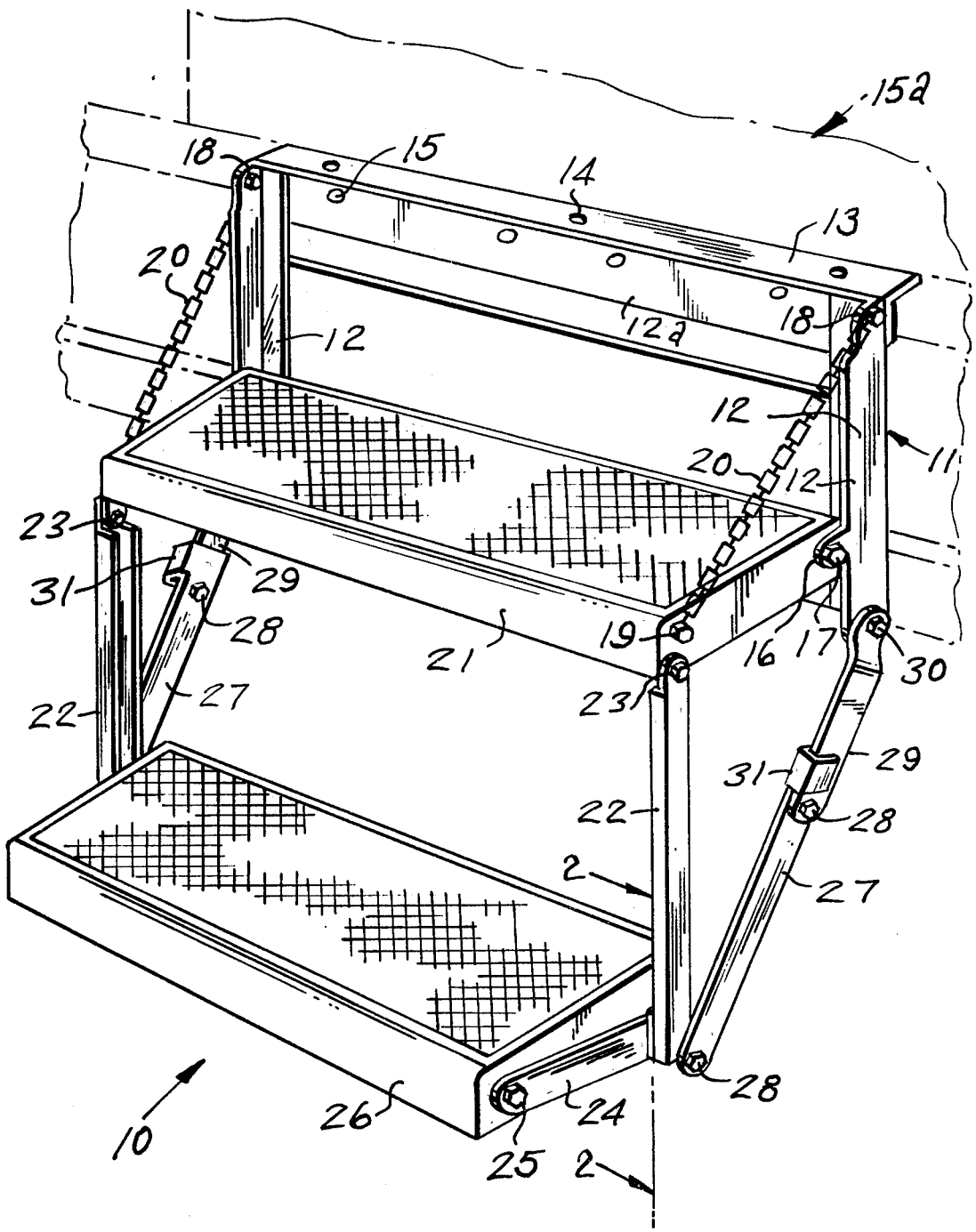

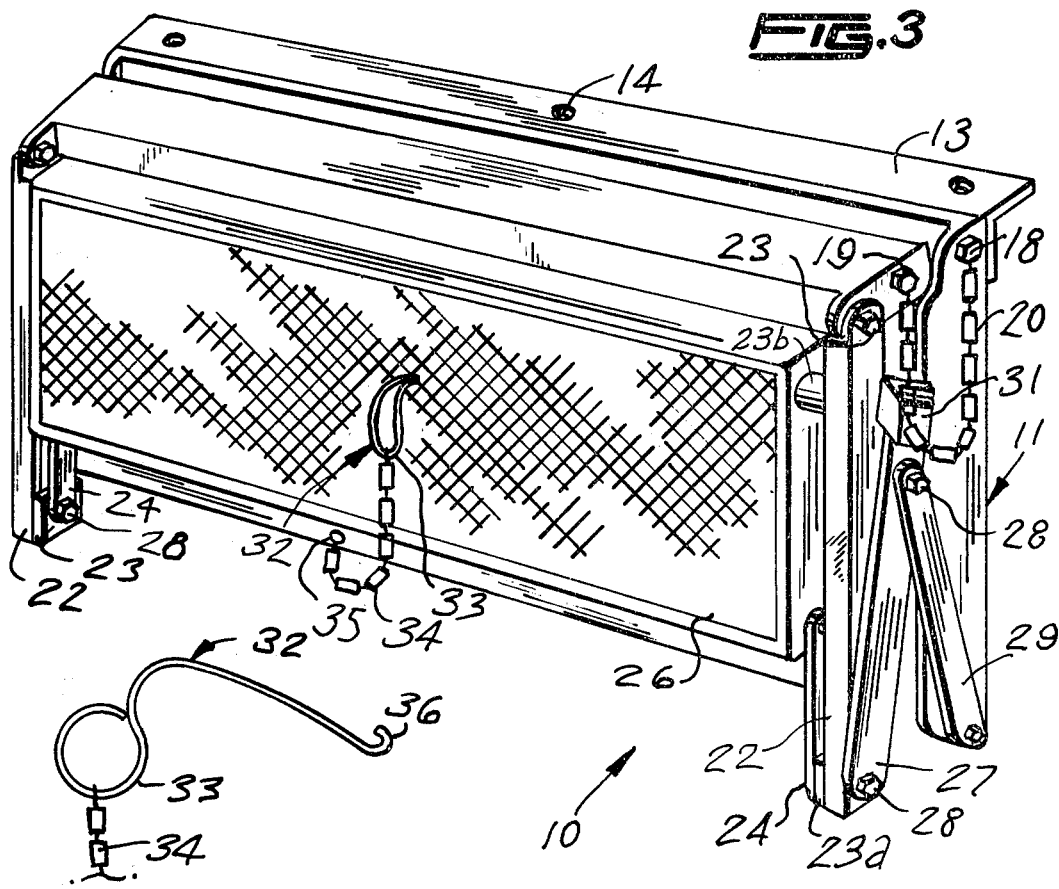
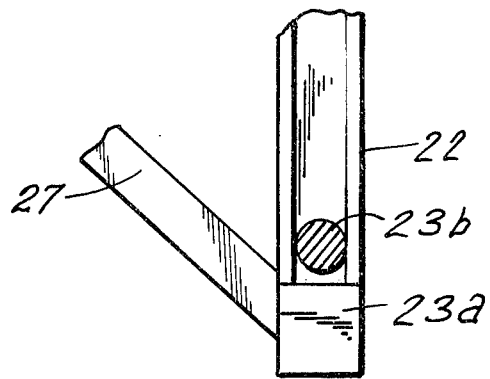

CAMPER STEPS

This invention relates to accessories for campers, and more particularly to camper steps.

It is, therefore, the principal object of this invention to provide camper steps, which will enable suitable access from the ground level, to the door of the camper.

Another object of this invention is to provide camper steps, which will be adaptable for use with a truck camper combination, so the camper is removable from the truck, and the invention is of such structure, so as to be readily adaptable to the door of the above mentioned campers.

The rear of these campers, is where the door is situated, and the bottom of the door is approximately 26 inches from the ground. The present invention is such, that only three easy steps are required by a person who wishes to enter the camper.

A further object of this invention is to provide camper steps of the type described, which will fold and unfold easily and will fold almost flat against the rear of the camper, so as to be out of the way.

A still further object of this invention is to provide camper steps of the type decribed, which will also fold above any trailer hitch that may be on the truck, and the trailer hitch may be used while the steps are in the folded position. In the event the steps are left in the unfolded position, and the truck is driven forward, no damage will occur to the steps if they make contact with a high object in the road, the chains of the structure will enable the steps to rise over the above mentioned object.

These and other objects will be readily evident upon a study of the following specification and the accompanying drawings, wherein:

FIG. 1 is a perspective view of the present invention, shown in the open position;

FIG. 2 is an enlarged cross-sectional view taken along the line 2—2 of FIG. 1;

FIG. 3 is a perspective view, showing the invention in the closed position; and

FIG. 4 is a plan view of the key that holds the steps in the folded position.

According to this invention, camper steps 10 are shown to include a rectangular frame 11, having parallel spaced apart and L-shaped channel members 12, and an upper bar 12a is secured fixedly thereto. An adapter bar 13, of L-shaped configuration, is secured by means of the openings 14 which receive suitable fasteners 15, which will render frame 11 stationary upon the rear of camper 15a. A lug 16, integral of members 12, receives suitable fasteners 17, for a purpose which hereinafter will be described. The upper end of members 12 has secured thereto fasteners 18, and the fasteners 19 provide securement means for chain 20, in conjunction with fasteners 18. The fasteners 17 are secured to the sides of step 21, and provide pivot means for step 21.

A pair of U-shaped, configured channel members 22 are parallel spaced apart, and are pivotably secured by fastener 23, to the forward side edges of step 21. A pair of pins 23b extend outwardly from opposite ends of step 26 and are slidably received in an associated one of channel members 22. A bar, or block, 23a is fixedly secured to the bottom of each of the channel members 22, and provides stop means for pins 23b of step 26. Rods 24 are pivotably secured, at one end, to the side edges of the lower step 26, and pin 23b is freely and slideably received within member 22. A pair of pivotable rods 27 are secured to the lower ends of channels 22 by fasteners 28. An upper fastener 28 pivotably secures the rods 27 to rod 29, which is pivotably secured by fastener 30 to the lower end of member 12, and a U-shaped channel portion 31, terminating rod 27, provides guide and stop means for locking rod 29, when camper steps are in the full open position.

A key 32 is provided with an eye or loop 33, which is attached freely to chain 34, which is fastened to steps 10 by fastener 35, and the hook end 36 is insertable within steps 21 and 26, so as to hold the invention 10 folded when desired.

It shall be noted tht simple adapters are furnished for some installations, that are not described herein.

While various changes may be made in the detail construction, it is understood that such changes will be within the spirit and scope of the present invention, as is defined by the appended claims.

What I claim is:

1. Foldable steps for use on a camper vehicle or the like comprising:
    a frame for mounting on the vehicle;
    a first step pivotally connected at its rear portion to said frame for swinging motion between a retracted, substantially vertical position and an extended, substantially horizontal position;
    means for limiting the swinging motion of said first step below its extended position;
    a pair of spaced-apart channel members, each being pivotally connected to the front portion of opposite sides of said first step generally vertically disposed;
    a second step pivotally connected by folding means at opposite sides thereof to said channel members for folding between a retracted position in which said second step is substantially coplanar with said channel members, and an extended position in which said second step extends horizontally outwardly from the bottom region of said channel members;
    said folding means including a pair of pins, each projecting outwardly from the rear portion of an opposite side of said second step and received within an associated one of said channel members for slidable movement therewithin, and a pair of rods, each pivotally connected at one end thereof to the front portion of opposite sides of said second step and at its other end to the lower portion of an associated one of said channel members; and
    means for maintaining the vertical disposition of said channel members when said first step is extended.

2. The steps of claim 1 wherein said means for maintaining the vertical disposition of said channel members includes a pair of braces, each pivotally attached at one of its ends to said frame and at its other end to the lower region of an associated one of said channel members, each of said braces being foldable between a locked, extended position and a folded, retracted position.

* * * * *